United States Patent
Klingler et al.

[11] 3,911,016
[45] Oct. 7, 1975

[54] N-FLUOROALKYLATED PHENYLETHYLAMINE

[75] Inventors: Karl Heinz Klingler, Langen; Silke Habersang, Dornigheim, both of Germany

[73] Assignee: Deutsche Gold- und Silber-Scheideanstalt vormals Roessler, Germany

[22] Filed: July 27, 1972

[21] Appl. No.: 275,453

[30] Foreign Application Priority Data
Aug. 28, 1971 Germany............................ 2143204

[52] U.S. Cl..... 260/570.8 R; 260/456 P; 260/501.1; 260/501.7; 260/501.19; 260/501.21; 260/570.6; 260/592; 260/600; 260/601 H; 260/653; 424/316; 424/330
[51] Int. Cl.².............................................. C07C 87/29
[58] Field of Search.................. 260/570.5, 570.8 R; 424/330

[56] References Cited
UNITED STATES PATENTS

| | | | |
|---|---|---|---|
| 3,117,160 | 1/1964 | Holland | 260/570.8 |
| 3,320,319 | 5/1967 | Schuler et al. | 260/570.8 |
| 3,345,361 | 10/1967 | Ehrhart et al. | 260/570.8 |
| 3,400,155 | 9/1968 | Ehrhart et al. | 260/570.8 |
| 3,652,543 | 3/1972 | Hoegerle | 260/570.8 |

*Primary Examiner*—R. V. Hines
*Attorney, Agent, or Firm*—Cushman, Darby & Cushman

[57] ABSTRACT

Fluoroalkylated phenylethylamine derivatives are prepared having the formula

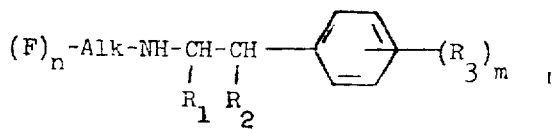

where Alk is an alkylene group having 2 to 6 carbon atoms, $R_1$ is hydrogen or methyl, $R_2$ is hydrogen or hydroxy, $R_3$ is hydrogen, halogen, hydroxy, trifluoromethyl, alkyl of 1 to 6 carbon atoms, alkoxy of 1 to 6 carbon atoms, m and n are integers of 1 to 3 as well as acid addition salts thereof. The compounds are useful in weight control.

1 Claim, No Drawings

N-FLUOROALKYLATED PHENYLETHYLAMINE

In Belgian patent 588,736 there are disclosed phenylethylamine derivatives of the formula

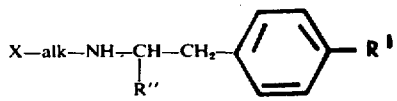

where R' is hydrogen, halogen, hydroxyl or lower alkyl, R'' is hydrogen or methyl, alk is a lower alkylene group with 2 or 3 carbon atoms and X is hydroxyl, chloro or bromo. These compounds heighten the activity of the central nervous system.

The present invention is directed to fluoroalkylated phenylethylamine derivatives of the formula

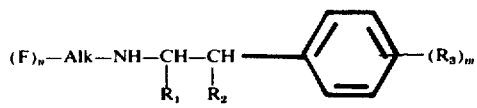

where Alk is a straight or branched chain alkylene group having 2 to 6 carbon atoms, $R_1$ is hydrogen or methyl, $R_2$ is hydrogen or hydroxyl, $R_3$ is hydrogen, halogen, hydroxyl, trifluoromethyl, alkyl with 1 to 6 carbon atoms or an alkoxy group with 1 to 6 carbon atoms, wherein the individual $R_3$ groups are the same or different and n and m are integers from 1 to 3 and their acid addition salts with pharmaceutically acceptable acids, e.g., sulfuric acid, hydrochloric acid, hydrobromic acid, phosphoric acid, citric acid, succinc acid, tartaric acid, acetic acid, p-toluenesulfonic acid, lactic acid, propionic acid, malic acid, maleic acid The compounds of the invention possess favorable appetite suppressing properties with good tolerance. The appetite suppressing activity is partially tied to a mild stimulating activity. Some compounds also have a broncholytic effect.

As halogen atoms there are used halogens of atomic weight 9 to 80, i.e., chlorine, bromine or fluorine. As alkyl or alkoxy groups there are especially employed those having 1 to 4 carbon atoms, preferably 1 to 2 carbon atoms, n is preferably 1 and m is preferably 1 or 2.

Especially favorable activity is shown by compound of formula I where Alk has 2 to 5 carbon atoms, n is 1, $R_1$ is hydrogen or methyl, $R_2$ is hydrogen or hydroxy and $R_3$ is hydrogen or alkoxy with 1 to 6, especially 1 to 4 carbon atoms, or alkyl with 1 to 6, especially 1 to 4 carbon atoms, or a hydroxy group and m is especially 1 or 2 and in the case where m is 1 $R_3$ is in the ortho or para position, in the case where m is 2 the groups $R_3$ preferably are in the 3,4 or 3,5 positions.

Examples of compounds within the invention include (2-fluoroethyl)-[1-methyl-2-(o-methoxyphenyl)-ethyl]-amine), (5-fluoropentyl)-[1-methyl-2-(o-methoxyphenyl)-ethyl]-amine, (2-fluoroethyl)-[1-methyl-2-(p-tolyl-ethyl]-amine, (4-fluorobutyl)-[1-methyl-2-(1-methyl-2-(1-methyl-2-phenylethyl)]-amine, (5-fluoropentyl)-(1-methyl-2-phenylethyl)-amine, 1-(2-fluoroethyl)-(1-methyl-2-hydroxy-2-phenylethyl)-amine, (6-fluorohexyl)-[1-methyl-2(p-hydroxyphenyl-ethyl]-amine, (3-fluoropropyl)-[1-methyl-2-(3,4-dihydroxyphenyl)-ethyl]-amine, (2-trifluoroethyl)-(1-methyl-2-phenylethyl)-amine, (2-trifluoroethyl)-1-methyl-2-(p-chlorophenylethyl)-amine, 1-(5-fluoropentyl)-1-methyl-2-hydroxy-2-phenylethyl-amine, (2-fluoroethyl)-[1-methyl-2-(3,4-dihydroxyphenyl)-ethyl]-amine, (4-fluoro-2-methylbutyl)-[1-methyl-2-(o-ethoxyphenyl)-ethyl]-amine, (2-fluoro-1-methylethyl)-[1-methyl-2-hydroxy-2-(3,5-xylyl)-ethyl]-amine, (2-fluoropentyl)-[1-methyl-2-(3,5-dihydroxyphenyl)-ethyl]-amine, (3,3-difluoropropyl)-[1-methyl-2-(m-hydroxyphenyl)ethyl]-amine, (2-fluoroethyl)-[1-methyl-2-(3,4,5-trihydroxyphenyl)-ethyl]-amine, (3-fluoropropyl)-[1-methyl-2-(p-trifluoromethyl-phenyl)ethyl]-amine, (5-fluoropentyl)-[1-methyl-2-(2-methyl-4-hydroxy-6-chlorophenyl)-ethyl]-amine, (2-fluoroethyl)-[1-methyl-2-hydroxy-2-(o-bromophenylethyl)]-amine, (3-trifluoropropyl)-1-methyl-2-(p-fluorophenylethyl)-amine, (2-fluoroethyl)-1-methyl-2(3-chloro-4-bromophenylethyl)-amine, (2-fluoroethyl)-[1-methyl-2(p-hexoxy-phenyl-ethyl)]-amine, (4-fluoroethyl)-[1-methyl-2(o-hexyl phenyl)-ethyl]-amine, (2-fluoroethyl)-[1-methyl-2(p-butyl-phenyl) ethyl]-amine, (2-trifluoroethyl)-[1-methyl-2-(o-butoxyphenyl) ethyl]-amine, (5-fluoropentyl)-[1-methyl-2-(p-sec.butyl-phenyl)ethyl]-amine, (4-fluorobutyl)-[1-methyl-2-hydroxy-(3,4,5-trimethyl-phenyl)-ethyl]-amine, (2-fluoroethyl)-[1-methyl-2-hydroxy-(4-ethylphenyl)-ethyl]-amine, (2-fluoroethyl)-(2-o-methoxyphenyl ethyl)-amine, (5-fluoropentyl)-phenylethyl)-amine, (2-fluoroethyl)-[2-p-tolylethyl]-amine, (4-fluorobutyl)-(2-p-tolylethyl)-amine, (5-fluoropentyl)-(2-phenylethyl)-amine, 1-(2-fluoroethyl)-(2-hydroxy-2-phenylethyl)-amine, (6-fluorohexyl)-(2-p-hydroxyphenylethyl)-amine, (3-fluoropropyl)-[2-(3,4-dihydroxyphenyl)-ethyl]-amine, (2-trifluoroethyl)-(2-phenylethyl)-amine, (2-trifluoroethyl)-2-(p-chlorophenylethyl)-amine, 1-(5-fluoropentyl)-2-hydroxy-2-phenylethyl-amine, (2-fluoroethyl)-[2-(3,4-dihydroxyphenyl)-ethyl]-amine.

The compounds of the invention can be prepared in the following manner:

a. reacting a compound of the formula $$(F)_n—Alk—Z$$

II in the presence or absence of a solvent or suspending agent with a compound of the formula

III where $R_4$ is either oxygen or is the $R_2$ group + hydrogen and one of the Z and X groups is always an amino group and the other is either a halogen of atomic weight 35 to 80, i.e., chlorine or bromine or an alkyl sufonyloxy or arylsulfonyloxy group; moreover, X in combination with $R_4$ can also be an oxygen atom, and if $R_4$ is oxygen with subsequent reduction to the hydroxyl group; or (b) reacting a compound of the formula $$(F)_n—Alk'—V \quad \text{IV}$$

with a compound of the formula

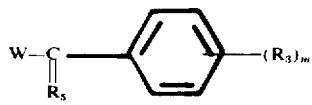

where Alk' is an alkylene group like Alk but having one less carbon atom, $R_5$ is oxygen or $R_2$ + hydrogen, V and W are always different and V is either the group

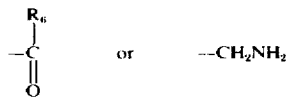

or A where $R_6$ is hydrogen or a lower alkyl with 1 to 4 carbon atoms and A is $-CO_2H$, $-COCl$, $-CO\,Br$ or carbalkoxy or cyano and W is either

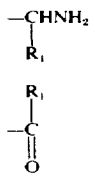

with simultaneous or subsequent reduction.

Examples of starting compounds within formula II are 1-fluoro-2-bromoethane, 1-fluoro-2-chloroethane, 1,1-difluoro-2-chloroethane, 1,1-difluoro-2-bromoethane, 1,1,1-trifluoro-2-bromoethane, 1,1,1-trifluoro-2-chloroethane, 1,1,1-trifluoro-2-chloroethane, 1-fluoro-2-aminoethane, 1,1-difluoro-2-aminoethane, 1,1,1-trifluoro-2-aminoethane, 1-fluoro-5-brompentane, 1-fluoro-5-chloropentane, 1-fluoro-5-aminopentane, 1-fluoro-4-bromobutane, 1-fluoro-6-bromohexane, 1-fluoro-6-chlorohexane, 1-fluoro-6-aminohexane, 1-fluoro-3-bromopropane, 1,1,1-trifluoroethyl p-toluenesulfonate, 1-fluoroethyl p-toluenesulfonate, 1,1-difluoroethyl p-toluenesulfonate, 1-fluorohexyl p-toluenesulfonate, 1,1,1-trifluorohexyl p-toluenesulfonate, 1,1,1-trifluoroethyl benzenesulfonate, 1,1,1-trifluoroethyl ethanesulfonate, 1-fluoropropyl methanesulfonate, 1-fluorohexyl dodecanesulfonate.

Examples of starting materials within formula III are o-methoxyphenylisopropylamine, o-methoxyphenylethylamine, o-methoxyphenylisopropyl chloride, o-methoxyphenyl-isopropyl bromide, o-methoxyphenylethyl chloride, o-methoxyphenyl alphachloroethyl ketone, o-methoxyphenyl alpha-bromoethyl ketone, o-methoxyphenyl alpha aminoethyl ketone, o-methoxyphenyl chloromethyl ketone, o-methoxyphenylisopropyl p-toluenesulfonate, o-methoxyphenylethyl p-toluenesulfonate, o-methoxyphenylisopropyl benzenesulfonate, o-methoxyphenyl ethylene oxide, p-chlorophenylpropylene oxide, phenylpropylene oxide, o-methoxyphenyl methanesulfonate, o-methoxyphenyl ethanesulfonate, o-methoxyphenyldodecanesulfonate, 2,4-dimethoxyphenyl isopropylamine, 3,4-dimethoxyphenyl ethylamine, 2,4,5-trimethoxyphenyl isopropylamine, 3,4-dimethoxyphenyl-ethyl bromide, 2-methyl-4-chloro-5-hydroxyphenylisopropylamine, 3-ethoxy-4-bromo-5-butylphenylisopropylchloride, p-methylphenylisopropylamine, p-methylphenylisopropyl chloride, o-methylphenylethyl bromide, m-methylphenylisopropylamine, 3,4-dimethylphenylisopropylamine, 3,5-dimethylphenylisopropyl bromide, 2,4-diethylphenylisopropylamine, phenylethylamine, phenylisopropylamine, phenylisopropyl chloride, phenylisopropyl bromide, phenyl alphachloroethyl ketone, 1-norephedrine, 1-phenyl-1-hydroxy-2-chloropropane, 1-phenyl-1-hydroxy-2-bromopropane, 1-p-hydroxyphenyl-1-hydroxy-2-bromopropane, 1-phenyl-1-hydroxy-2-bromoethane, 1-p-o-hydroxyphenyl-1-hydroxy-2-chloroethane, 1-o-chlorophenyl-2-bromopropane, 1-m-bromophenyl-2-amino-propane, 3,4-dichlorophenylisopropyl amine, 4-hexylphenylisopropylamine, 2-hexoxyphenylethylamine, 2,4,5-trihydroxyphenylisopropylamine, 4-fluorophenylisopropylamine, 4-trifluoromethylphenylisopropylamine.

Examples of starting compounds within formula IV are the various fluoroamines set forth above under formula II (except 1-fluorohexane) and fluoroacetaldehyde, trifluoroacetaldehyde, beta fluoropropionaldehyde, gamma fluorobutyraldehyde, delta-fluorovaleraldehyde, epsilon fluorocaproaldehyde, alpha-methyl-beta-fluoropropionaldehyde, fluoroacetic acid, difluoroacetic acid, trifluoroacetic acid, beta trifluoropropionic acid, beta fluoropropionic acid, gamma fluorobutyric acid, delta fluoroavaleric acid, epsilon fluorocaproic acid, fluoroacetyl chloride, fluoroacetyl bromide, beta fluoropropionyl chloride, gamma fluorobutyryl chloride, methyl fluoroacetate, methyl trifluoroacetate, ethyl fluoroacetate, propyl fluoroacetate, methyl beta-trifluoropropionate, fluoroacetonitrile, beta fluoropropionitrile, gamma fluorobutyronitrile, epsilon fluorocapronitrile, trifluoroacetonitrile.

Examples of starting materials within formula V include the amines set forth supra under formula III as well as 1-phenylacetyl carbinol, d-phenylacetyl carbinol, d,1-phenylacetyl carbinol, methyl benzyl ketone, 1-hydroxy-2-phenyl acetaldehyde, p-methoxybenzyl methyl ketone, p-methylbenzyl ketone, o-methylbenzyl methyl ketone, p-hydroxybenzyl methyl ketone, m,p-dihydroxybenzyl methyl ketone, o,m-dichlorobenzyl methyl ketone, o-chloro-p-bromobenzyl methyl ketone, p-fluorobenzyl methyl ketone, p(trifluoromethyl)benzyl methyl ketone, m,p-di(trifluoromethyl) benzyl methyl ketone, benzyl methyl ketone, phenylacetaldehyde, p-methoxyphenyl acetaldehyde, o-methoxyphenyl acetaldehyde, 2,3,4-trihydroxyphenyl acetaldehyde, m-butylphenyl acetaldehyde, 3,4-diisopropylphenyl acetaldehyde, 4-chlorophenyl acetaldehyde, 2-bromophenyl acetaldehyde, 4-methylphenyl acetaldehyde, d,1-4-bromophenylacetyl carbinol, d,1-4-chlorophenylacetyl carbinol, d,1-3-fluorophenylacetyl carbinol, d,1-2-methoxyphenylacetyl carbinol, d,1-4-propoxyphenylacetyl carbinol, d,1-3-methoxy-4-butoxyphenylacetyl carbinol.

In the above-mentioned processes (a) and (b) it is frequently appropriate to protect the phenolic hydroxyl groups as well as the amino group with known protective groups. Frequently such protective groups are required for production of the starting compounds. These protective groups are easily splittable from the final products. There can be employed either easily solvolytic acyl groups, e.g., acetyl or propionyl, or groups splittable by hydrogenation, for example, the benzyl radical. The solvolytic splittable protective groups are split off for example by saponification with dilute acids, e.g., dilute hydrochloric acid or sulfuric acid, at room temperature or by a short boiling. Depending on the type of protective group it can be split off during the reaction process. The latter is the case, for example, if the amino group as well as, in a given case, the phenolic hydroxyl group are protected by a benzyl group or a carbobenzoxy radical and the process includes a catalytic reduction step. If the protective group is not split off during the reaction, a simple after treatment of the reaction product is necessary whereby the splitting off of the protective group or groups takes place for example under the conditions set forth above.

As protective groups for the amino group there can be used, for example: benzyl group, alpha-phenyl-ethyl group, benzyl groups substituted in the benzene nucleus, for example, p-bromobenzyl or p-nitrobenzyl, the carbobenzoxy group, the carbobenzthio group, the trifluoroacetyl group, the phthalyl radical, the trityl radical, the p-toluenesulfonyl radical and the like. For the phenolic hydroxyl group basically there can be used the same protective group and in addition there can be used simply acyl groups such as for example, the acetyl group and the propionyl group.

Process (a) can be carried out with or without a solvent at elevated temperatures. As solvents there can be employed organic solvents, for example, alcohols, e.g., ethyl alcohol, isopropyl alcohol, propyl alcohol, methyl alcohol, butyl alcohol, amyl alcohol, or hydrocarbons, e.g., benzene, toluene and xylene or other solvents such as dimethyl formamide. Generally a temperature between 5° and 200°C is employed. In a given case it is recommended to work in the presence of an acid accepter, for example, potash, sodium carbonate, etc. There can also be used excess amine as the acid accepter.

As compounds in which Z or X is a sulfonyloxy group there can be employed especially the corresponding aliphatic hydrocarbon sulfonic acid derivatives, especially the saturated aliphatic sulfonic acid derivatives, i.e., alkane sulfonic acid derivatives, particularly those having 1 to 6 carbon atoms, i.e., methane-sulfonic to hexanesulfonic acid, the aromatic sulfonic acid derivatives, for example, benzenesulfonic acid or lower alkylbenzenesulfonic derivatives (for example the tosyloxy group). When using starting materials with a cyclic oxygen atom the temperature range is preferably 0 to 100°C. In this case it is especially recommended to use starting materials of formula III in which the OH groups are protected.

In process (b) the reactants are reacted at normal or elevated pressure at temperatures between 0° and 100°C, preferably 30°–100°C. The process can be carried out in solution or suspension using the conventional solvents or solvent mixtures, such as the solvents mentioned above, for example. As reducing agents there can be used for example nascent hydrogen in neutral or basic medium, electrolytic reduction, sodium-alcohol (e.g., sodium-ethyl alcohol), sodium or aluminum amalgam, hydrogen in the presence of conventional hydrogenation catalysts (for example, Raneynickel, platinum, palladium) or complex hydrides such as, for example, lithium aluminum hydride. In the event benzyl groups are to be removed simultaneously with the hydrogenating condensation preferably there are used palladium catalysts because first the direct condensation product is produced and this is then reduced in a given case after previous isolation and purification.

In the event starting compounds are employed in which $R_4$ is an oxygen atom this must be reduced to a hydroxyl group. Generally catalytic hydrogenation is preferred for this purpose. As catalysts there can be used for example the usual finely divided metal catalysts, such as the noble metal catalysts, for example, platinum or, especially, palladium. The process can be carried out at normal or elevated temperature. A temperature range of about 40° to 100°C is suitable. In the event that the phenolic hydroxyl groups and/or the amino groups are protected with benzyl groups, for examples, they are split off simultaneously with the hydrogenation if, for example, a palladium catalyst is used. This reduction of the keto group, however, is also possible by other means, for example, by complex metal hydrides such as lithium aluminum hydride or sodium borohydride, nascent hydrogen or aluminum alcoholates, e.g., aluminum ethylate. This reduction can be carried out immediately subsequently without previous isolation of the keto intermediate compound. Protective groups which may be present in a given case are split off thereby.

The compounds can be converted to salts in known manner. As anion for the salts there can be used, as stated above, known and therapeutically useful acid groups such as for example hydrochloric acid, hydrobromine acid, sulfuric acid, acetic acid, p-toluenesulfonic acid, succinic acid, maleic acid, malonic acid, lactic acid, tartaric acid, citric acid, phosphoric acid, etc.

The free bases can be produced from the salts of the compounds in known manner for example by treating a methanolic solution with sodium carbonate or soda lye.

Those compounds which contain asymmetrical carbon atoms and as a rule are formed as racemates can be split into the optically active isomers, for example, by means of an optically active acid. However, it is also possible to begin with optically active or diastereomeric starting materials whereby the final product contains a corresponding pure optically active form or diastereomeric configuration. Steroisomeric racemates can also occur if two or more asymmetrical carbon atoms are present in the compounds produced. Separation is possible in the usual manner, for example, by recrystallization.

The starting materials of formula III where X is a halogen atom and $R_4$ is a hydroxy group + hydrogen, in case they are not known, can be obtained from the corresponding 1-oxo-1-(hydroxyphenyl)-2-halogen alkanes, in which the oxy groups are preferably protected, by reduction of the keto group with sodium borohydride. Starting materials of formula III in which X forms an oxygen atom in combination with $R_4$ (the other $R_4$ combination is hydrogen), can be formed in customary manner from halogen hydrides of formula III where X is halogen and $R_4$ if OH + H (see Houben-Weyl, Vol. 613, page 374 et seq.): treatment of the halohydrin with an alkaline agent for example alcoholic KOH at low temperature. The phenolic hydroxyl groups are preferably protected and, in a given case, the protective groups are subsequently removed.

The compounds of the invention are suited for the production of pharmaceutical compositions and preparation. The pharmaceutical compositions or drugs contain as the active material one or several of the compounds of the invention, in a given case in admixture with other pharmacologically or pharmaceutically effective materials. The production of the medicine can take place with the use of known and customary pharmaceutical carriers and diluents as well as other customary assistants.

Such carriers and assistants are set forth for example in Ullmann's Encyklopädie der technischer Chemie, Vol. 4 (1953), pages 1 to 39; Journal of Pharmaceutical Sciences, Vol. 52 (1963) pages 918 et seq; H. v. Czetsch-Lindenwald, Hilfstoffe für Pharmazie und angrenzende Gebiete, as well as in Pharm. 2nd., Vol. 2 (1961), pages 72 et seq.

Examples of such materials include gelatin, sucrose, pectin, starch, tylose, talc, lycopodium, silica, lactose, cellulose derivatives, micropulverized cellulose, stearates, e.g., methylstearate, and glyceryl stearate, emulsifiers, vegetable oils, water, pharmaceutically compatible mono or polyvalent alcohols and polyglycols such as glycerine, mannitol, sorbitol, pentaerythritol, ethyl alcohol, diethylene glycol, trithylene glycol, ethylene glycol, propylene glycol, dipropylene glycol, polyethylene glycol 400, as well as derivatives of such alcohols and polyglycols, dimethyl sulfoxide, esters of saturated and unsaturated fatty acids with mono or polyvalent alcohols such as glycols, glycerine, diethylene glycol, pentaerythritol, sorbitol, mannitol, etc., e.g., glyceryl stearate, glyceryl palmitage, glyceryl oleate, ethylene glycol stearate; such esters of polyvalent alcohols can in a given case also be etherified, benzyl benzoate, dioxolane, glycerine formal, glycol furfural, dimethyl lacetamide, lactamide, lactates, e.g., ethyl lactate, ethyl carbonate, etc.

Furthermore, there can be added preservatives, stabilizers, buffers, taste correctives, antioxidants and complex formers (for example, ethylenediaminotetracetic acid) and the like. In a given case for stabilization of the active molecule a pH in the range of about 4–7 can be established with physiologically compatible acids or buffers.

As antioxidants there can be used for example sodium meta bisulfite and ascorbic acid, as preservatives there can be used for example sorbic acid, p-hydroxybenzoic acid esters, e.g., methyl p-hydroxybenzoate and ethyl p-hydroxybenzoate and similar materials.

The pharmacological and galenical treatment of the compounds of the invention takes place according to the usual standard methods.

The drugs can be used enterally, parenterally, orally, perlingually or in the form of sprays.

The compounds of the invention have a good appetite controlling activity, i.e., they act as appetite depressants.

The appetite controlling activity is comparable to that of the known drug chlorphentermine, The lowest effective appetite controlling dosage in animal experiments for example is 0.5–1 mg/kg body weight orally.

As a general range of dosage for activity (based on animal studies) there can be employed 0.5–100 mg/kg orally.

The compounds of the invention have utility in treating overweight.

The pharmaceutical preparations generally contain between 1 and 50 weight percent of the active component of the invention.

The compounds can be delivered in the form of tablets, capsules, pills, dragées, suppositories, gels, cremes, powders, liquids, dusts or aerosols. As liquids there can be used oily or aqueous solutions or suspensions, emulsions, injectable aqueous or oily solution or suspensions. The preferred forms of use are tablets which contain between 10 and 150 mg. of active material.

In individual doses the armount of active component of the invention can be used for example in an amount of 10 to 150 mg. dispensed orally. These doses can be dispensed once or several times a day.

For example, there is recommended the use of 1 to 2 tablets containing 30 to 900 mg. of active ingredients three times daily.

The acute toxicity of the compounds of the invention in the mouse (expressed by the LD50 mg/kg method of Miller and Tainter, Proc. Soc. Exper. Biol, and Med. Vol. 57, (1944), pages 261 et seq.) in oral application is at least 120 mg/kg, for example, above 680 mg/kg in some cases.

The drugs can be used in human medicine, in veterinary medicine, e.g., to treat cats, dogs, horses, sheep, cattle, goats and pigs or in agriculture. The drugs can be used alone or in admixture with other pharmacologically active materials.

Unless otherwise indicated, all parts and percentages are by weight.

EXAMPLE 1

(2-Fluoroethyl)-[1-methyl-2-(o-methoxyphenyl)ethyl]-amine

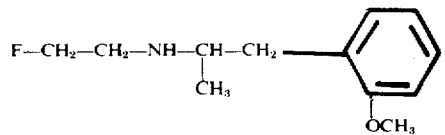

12.3 grams of 1-fluoro-2-bromoethane and 16.5 grams of o-methoxyphenylisopropylamine with the addition of 20.7 grams of potassium carbonate and/ml of water in 50 ml of toluene were heated at reflux with stirring for 10 hours. The inorganic salt was dissolved by the addition of 30 ml of water, the aqueous phase separated off and the toluene distilled off in a vacuum. The residue was dissolved in acetone, filtered and acidified with alcoholic hydrochloric acid. The salt crystallizing out was filtered with suction and recrystallized from isopropyl alcohol. The hydrochloride melted at 168°–170°C.

This product can also be obtained by the hydrogenating condensation of fluoroacetaldehyde with o-methoxyphenylisopropylamine in alcoholic solution using palladium-carbon catalyst:

6.2 grams of fluoroacetaldehyde were added to 16.5 grams of o-methoxyphenylisopropylamine in 50 ml of ethanol and after the addition of 1.5 grams of 5 percent palladium-carbon catalyst hydrogenated at 5°C. The product was filtered, acidified with hydrochloric acid and the solvent distilled off in a vacuum. The result was recrystallized from isopropyl alcohol. Yield, 9.8 grams. M.P. 167°–169°C.

EXAMPLE 2

(5-Fluoropentyl)-[1-methyl-2-(o-methoxyphenyl)ethyl]-amine.

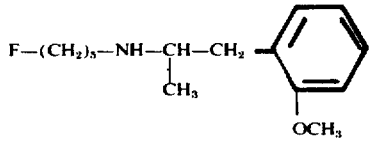

This compound was obtained from 16.9 grams of 1-fluoro-5-bromopentane, 16.5 grams of o-methoxyphenylisopropyl-amine and 20.7 grams of potassium carbonate by reaction in toluene in the manner described in Example 1. The hydrochloride obtained melted at 115°–117°C.

EXAMPLE 3

(2-Fluoroethyl)-[1-methyl-2-(p-totyl)-ethyl]-amine

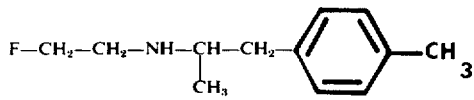

This compound was obtained by reaction of 1-fluoro-2-bromoethane with p-methylphenylisopropylamine and potassium carbonate in toluene using the same molar proportions and procedure described in Example 1. The hydrochloride obtained melted at 175°–177°C.

EXAMPLE 4

(4-Fluorobutyl)-[1-methyl-2-(p-totyl)-ethyl]-amine

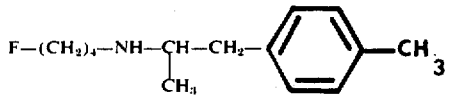

This compound was obtained by reaction of 1-fluoro-4-bromobutane with p-methylphenylisopropylamine and potassium carbonate in toluene using the same molar proportions and procedure described in Example 1. The hydrochloride obtained melted at 203°–205°C.

EXAMPLE 5

(5-Fluoropentyl)-[1-methyl-2-phenylethyl]-amine

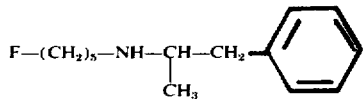

This compound was obtained by reaction of 1-fluoro-5-bromopentane with phenylisopropylamine and potassium carbonate in toluene using the same molar proportions and procedure described in Example 1. The hydrochloride obtained melted at 155°–156°C.

EXAMPLE 6

1-(2-Fluoroethyl)-[1-methyl-2-hydroxy-2-phenylethyl]-amine

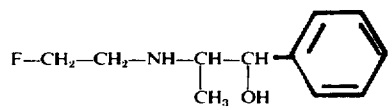

This compound was obtained by reaction of 1-fluoro-2-bromoethane with 1-norephedrine and potassium carbonate in toluene using the same molar proportions and procedure described in Example 1. The hydrochloride obtained melted at 197°–199°C.

EXAMPLE 7

(6-Fluorohexyl)-[1-methyl-2-(p-hydroxyphenyl)-ethyl]-amine

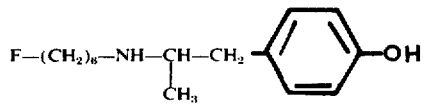

9.15 grams of 1-fluoro-6-bromohexane at 12 grams of benzyloxy-amphetamine with the addition of 10.3 grams of potassium carbonate and 40-ml of toluene were heated at reflux with stirring for 8 hours. There were added 15 ml of water to the reaction mixture, stirring was continued until the inorganic salt dissolved, the aqueous phase was separated off in a separating funnel, and the toluene distilled off in a vacuum. The residue was dissolved in isopropanol, the base solution obtained was filtered and acidified with alcoholic hydrochloric acid. After storing in the refrigerator the product was filtered with suction on the next day and dried. There was obtained 13 grams of (6-fluorohexyl)-(1-methyl-2-p-benzyloxyphenylethyl)-amine hydrochloride which was purified by recrystallization from isopropyl alcohol and melted at 173°–175°C.

To split off the benzyl group 8.6 grams of the product were dissolved in a warm mixture of 300 ml of methanol and 50 ml of distilled water and after the addition of 1 gram of palladium -BaSO₄ catalyst (5 percent palladium) hydrogenated at 50°C. After the end of the take up of hydrogen the product was filtered and evaporated in a vacuum. The solid residue was recrystallized from acetone. The hydrochloride melted at 136°–138°C.

EXAMPLE 8

(3-Fluoropropyl)-[1-methyl-2-(3,4-dihydroxyphenyl)-ethyl]-amine

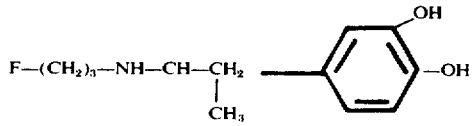

This compound was obtained by following the procedure of Example 7 using 1-fluoro-3-bromopropane with 3,4-dibenzyloxyphenylisopropylamine and potassium carbonate in toluene using the same molar proportions to first form (3-fluoropropyl)-[1-methyl-2-(3,4-dibenzyl-oxyphenyl)-ethyl]-amine hydrochloride melting at 125°–127°C and then catalytically hydrogenating as in Example 7 to split off the benzyl group. The final hydrochloride obtained melted at 158°–160°C.

EXAMPLE 9

(2-Trifluoroethyl)-[1-methyl-2-phenylethyl)]-amine

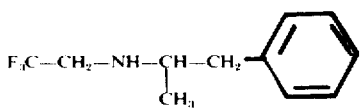

5.1 grams of 1,1,1-trifluoroethyl p-toluenesulfonate (prepared by reacting trifluoroethanol with p-toluenesulfonyl chloride in pyridine) and 5.95 grams of phenylisopropylamine were heated 160°–170°C for 8 hours with stirring. Subsequently the cooled reaction mixture was taken up in an ether-water mixture, the ether phase separated and the aqueous solution shaken several times with ether. The combined ether solutions were dried with potassium carbonate, filtered and acidified with alcoholic hydrochloric acid. The product was filtered off and dried. The hydrochloride melted at 185°–187°C.

EXAMPLE 10

(2-Trifluoroethyl)-1-methyl-2-(p-chlorophenylethyl)-amine

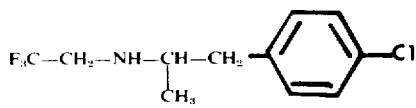

This compound was obtained by reaction of p-chlorophenylisopropylamine with 1,1,1-trifluoroethyl p-toluenesulfonate using the same molar proportions and procedure described in Example 9.

EXAMPLE 11

1-(5-Fluoropentyl)-[1-methyl-2-hydroxy-2-phenylethyl]-amine

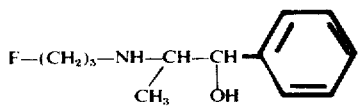

12.6 grams of fluoropentylamine and 15.0 grams of 1-phenylacetyl carbinol were dissolved in 70 ml of ethyl alcohol. There was added 0.8 grams of 5 percent palladium-carbon catalyst and hydrogenation carried out at room temperature. After the end of the hydrogen take up the product was filtered, acidified with hydrochloric acid, evaporated in a vacuum and recrystallized from isopropanol. There were obtained 8.5 grams of the hydrochoride, M.P. 205°–207°C.

EXAMPLE 12

(2-Fluoroethyl)-[1-methyl-2-(3,4-dihydroxyphenyl)-ethyl]-amine

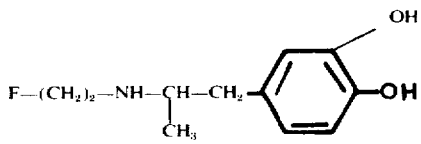

This compound was prepared in a manner analogous to that of Examples 7 and 8 using 1-fluoro-2-bromoethane and 3,4-dibenzyloxyphenylisopropylamine as starting materials. The hydrochloride obtained as the final product melted at 160°–163°C.

Preparation of
(2-Fluoroethyl)-[1-methyl-2(o-methoxyphenyl)-ethyl]-amine

The free base was produced by dissolving the hydrochloride salt (Example 1) in water, adding sodium carbonate solution and extraction with ether. The ethereal solution was dried with sodium sulfate, filtered and evaporated to give the base as a colourless oil.

What is claimed is:

1. A compound, which is (2-fluoroethyl)-[1-methyl-2-(o-methoxyphenyl)-ethyl]-amine.

* * * * *